United States Patent [19]

Peter-Hoblyn

[11] Patent Number: 6,051,040
[45] Date of Patent: *Apr. 18, 2000

[54] METHOD FOR REDUCING EMISSIONS OF $NO_X$ AND PARTICULATES FROM A DIESEL ENGINE

[75] Inventor: Jeremy D. Peter-Hoblyn, Cornwall, United Kingdom

[73] Assignee: Clean Diesel Technologies, Inc., Stamford, Conn.

[*] Notice: This patent is subject to a terminal disclaimer.

[21] Appl. No.: 08/978,687

[22] Filed: Nov. 26, 1997

Related U.S. Application Data

[63] Continuation of application No. 08/518,251, Aug. 23, 1995, abandoned, which is a continuation of application No. 08/089,838, Jul. 12, 1993, abandoned, which is a continuation-in-part of application No. 08/003,245, Jan. 11, 1993, abandoned, which is a continuation-in-part of application No. 07/808,435, Dec. 16, 1991, abandoned, which is a continuation-in-part of application No. 07/794,329, Nov. 12, 1991, abandoned, which is a continuation of application No. 07/291,245, Dec. 28, 1988, abandoned.

[51] Int. Cl.$^7$ .................................. C10L 1/30; C10L 1/22
[52] U.S. Cl. .................................. 44/358; 44/359; 44/361; 44/363; 123/1 A; 423/235; 423/236; 423/237; 431/4
[58] Field of Search .............................. 44/358, 359, 361, 44/363; 123/1 A; 423/235; 431/4

[56] References Cited

U.S. PATENT DOCUMENTS

| | | |
|---|---|---|
| 2,086,775 | 7/1937 | Lyons . |
| 2,151,432 | 3/1939 | Lyons . |
| 3,599,427 | 8/1971 | Jones .......................................... 60/30 |
| 4,295,816 | 10/1981 | Robinson ................................. 44/354 |
| 4,568,357 | 2/1986 | Simon ........................................ 44/57 |
| 4,891,050 | 1/1990 | Bowers ..................................... 44/358 |
| 4,892,562 | 1/1990 | Bowers ..................................... 44/324 |
| 4,997,631 | 3/1991 | Hofmann et al. ....................... 423/235 |
| 5,034,020 | 7/1991 | Epperly .................................... 44/358 |
| 5,266,083 | 11/1993 | Peter-Hoblyn ........................... 44/358 |
| 5,404,841 | 4/1995 | Valentine ................................ 44/302 |

FOREIGN PATENT DOCUMENTS 9202291  2/1992  WIPO .

OTHER PUBLICATIONS

Beckman et al, A New Generation of Diesel Oxidation Catalysts, Society of Automotive Engineers (SAE) Paper No. 922330, 1992.

Krutsch et al, Effect of Sodium– and Lithium–Based Fuel Additives on the Regeneration Efficiency of Diesel Particulate Filters. Society of Automotive Engineers (SAE), Paper No. 922188, 1992.

(List continued on next page.)

Primary Examiner—Margaret Medley
Attorney, Agent, or Firm—St. Onge Steward Johnston and Reens LLC

[57] ABSTRACT

A method improves the operation of a diesel engine through the use of a fuel additive, a diesel particulate trap and a $NO_x$-reducing catalyst. The operation of the $NO_x$-reducing catalyst is enhanced by the introduction of urea or like compound upstream of the catalyst at temperatures effective for non-catalytic $NO_x$ reduction and the generation of ammonia. The additive comprises fuel-soluble compositions of platinum group metal in effective amounts to lower the emissions of unburned hydrocarbons and carbon monoxide from the trap. The catalytic activity provided to the exhaust system by the fuel additive is selective and preferably reduces the oxidation of $SO_2$ to $SO_3$. The platinum group metal compositions are preferably added in amounts effective to provide concentrations of the metal in the fuel of less than 1 part per million (ppm). Lithium and/or sodium compositions can be used in amounts effective to reduce the trap regeneration temperature, e.g. concentrations to provide about 1 to 100 ppm lithium metal, and/or 1 to 30 ppm sodium metal.

18 Claims, 2 Drawing Sheets

OTHER PUBLICATIONS

McCabe et al, Oxidation of Diesel Particulates by Catalyzed Wall–Flow Monolith Filters. 2. Regeneration Characteristics of Platinum, Lithium, and Platinum–Lithium Catalyzed Filters, Society of Automotive Engineers (SAE), International Fuels and Lubricants Meeting and Exposition, Toronto, Canada, 1987. No month.

Murphy, et al, Assessment of Diesel Particulate Control—Direct and Catalytic Oxidation, Society of Automotive Engineers (SAE) Paper No. 810112, 1981.

Snider et al, Control of Diesel Engine Exhaust Emissions in Underground Mining, 2nd U.S. Mine Ventilation Symposium, Reno, Sep. 23–25, 1985.

Belluco, Organometallic & Coordination Chemistry of Platinum, Acedemic Press, N.Y, pp. 221–2; 226, 232, 295–7, 441–2, 449, 454–5, 1974.

Deganello, Transition Metal Complexes of Cyclic Polyolefins, Academic Press, N.Y., pp. 97–100, 102, 277–8, 281–3, 288–291, 1979.

Dickson, Organometallic Chemistry of Rhodium and Iridium, Academic Press, N.Y, pp. 167–9, 178–180, 198–200, 220–226, 248, 258–260, 264, 271 and 277, 1983.

Matelis, The Organic Chemistry of Palladium, Academic Press, N.Y, pp. 68, 70, 76, 77, 83, 93, 102, 103, 136, 158, 165, 202–204, 228, 242, 249, 257–8, 1971.

METHOD FOR REDUCING EMISSIONS OF $NO_x$ AND PARTICULATES FROM A DIESEL ENGINE

RELATED APPLICATIONS

This application is a continuation of U.S. patent application Ser. No. 08/518,251 filed Aug. 23, 1995 now abandon which is a continuation of U.S. patent application having Ser. No. 08/089,838, having the same title as the present application, filed Jul. 12, 1993, now abandoned, which is a continuation-in-part of copending and commonly assigned U.S. patent application having Ser. No. 08/003,245, entitled "Method for Reducing Harmful Emissions From a Diesel Engine Equipped With a Particulate Trap", filed in the names of Peter-Hoblyn, Valentine and Epperly on Jan. 11, 1993, now abandoned, which in turn is a continuation-in-part of copending and commonly assigned U.S. patent application having Ser. No. 07/808,435, now abandoned, entitled "Method for Reducing the Particulate Emissions from a Diesel Engine", filed in the names of Peter-Hoblyn, Valentine, Epperly, and Sprague on Dec. 16, 1991, now abandoned, which in turn is a continuation-in-part of copending and commonly assigned U.S. patent application having Ser. No. 07/794,329 entitled "Method for Reducing Emissions From or Increasing the Utilizable Energy of Fuel for Powering Internal Combustion Engines", filed in the names of Epperly, Sprague, Kelso, and Bowers, on Nov. 12, 1991, now abandoned, which in turn is a continuation of U.S. patent application Ser. No. 07/291,245, filed Dec. 28, 1988, now abandoned, the disclosures of each of which are incorporated by reference herein.

TECHNICAL FIELD

Diesel engines emit unburned hydrocarbons (HC), carbon monoxide (CO), nitrogen oxides ($NO_x$), and particulates, all of which are subject to current or proposed regulation. The problems of controlling these pollutants are compounded because there is a trade-off between particulates and nitrogen oxides—when the combustion conditions are modified to favor low nitrogen oxides emissions, particulates are increased. The problems are further compounded when particulate traps are employed to reduce the severity of the particulate emissions because particulate traps tend to increase the production of carbon monoxide. And, even with a trap, unburned hydrocarbons remain a problem.

It now appears that a combination of techniques, including diesel traps, will be required to meet realistic clean air goals. This manner of reducing particulates will be necessary because $NO_x$-reduction techniques, such as timing changes and exhaust gas recirculation, impose a trade-off with particulates. The achievement of lower emissions of $NO_x$, unburned hydrocarbons, and carbon monoxide, while controlling particulates over reasonable periods of time, continues to present a technical challenge.

BACKGROUND ART

Diesel particulates, their effect and control, are at the center of much concern and controversy. Their chemistry and environmental impact present complex issues. Generally, the diesel particulate matter is principally solid particles of carbon and metal compounds with adsorbed hydrocarbons, sulfates and aqueous species. Among the adsorbed species are aldehydes and polycyclic aromatic hydrocarbons (also called PAH's). Some of these organics have been reported to be potential carcinogens or mutagens. Unburned hydrocarbons are related to the characteristic diesel odor and include aldehydes such as formaldehyde and acrolein. The aldehydes, like carbon monoxide, are products of incomplete combustion.

It is not just these organics which are of concern. In one study, diesel particulates were tested along side $TiO_2$ and carbon without any adsorbed hydrocarbons. (U. Heinrich, et al, "Tierexperimentelle Inhalationsstudien Zur Frage der Tumorinduzierenden Wirkung von Dieselmotorabgasen und zwei Teststauben", *Oklolgische Forschung BMFT/GSF*, Munich, 1992) The reporters determined that all species tested showed carcinogenic tendency. Until further work clarifies this matter, it would be prudent to look for systems which could control particulates of any composition.

Unfortunately, increasing the recovery of particulates simply by modifying trap design or size would increase the rate of back pressure buildup within the trap. Moreover, control of the various pollutants seems to be interrelated, with reduction of one sometimes increasing levels of another. By modifying combustion to achieve more complete oxidation, decreases can be achieved for pollutants resulting from incomplete combustion, but $NO_x$ is typically increased under these conditions.

$NO_x$, principally NO and $NO_2$, contributes to smog, ground level ozone formation and acid rain. NO is produced in large quantities at the high combustion temperatures associated with diesel engines. The $NO_2$ is formed principally by the post oxidation of NO in the diesel exhaust stream. Several attempts have been made to reduce $NO_x$, such as by retarding engine timing, exhaust gas recirculation, and the like; however, with current technology, there is a tradeoff between $NO_x$ and particulates. When $NO_x$ is reduced, particulate emissions increase. And, as noted, conditions favoring low emissions of $NO_x$ often favor production of increased levels of CO and HC.

It has been proposed to employ ammonia or an equivalent in a catalytic process to reduce nitrogen oxides in internal combustion engines; however, these systems would not be practical as proposed for diesel exhaust. The presence of high levels of particulates and sulfur would surely adversely affect the catalyst. Therefore, the type of system disclosed by Jones in U.S. Pat. No. 3,599,427 would not be practical for diesel engines.

It is clear that diesel traps (either catalyzed or uncatalyzed) will be required in order to control particulates, especially where efforts are made to control $NO_x$. However, the use of uncatalyzed traps increases carbon monoxide and the use of catalyzed traps has other disadvantages—notably increases in the discharge of $SO_3$ and thus total particulates and other problems.

The use of diesel traps and the need to improve them has resulted in a great deal of research and a great number of patents and technical publications. The traps are typically constructed of metal or ceramic and are capable of collecting the particulates from the exhaust and withstanding the heat produced by oxidation of carbonaceous deposits which must be burned off at regular intervals.

This burning off, or regeneration, could occur by itself if the operating temperature of the trap were sufficiently high. However, in the typical situation, the exhaust temperature is not constantly high enough, and secondary measures such as electrically heating to raise the trap temperature or using a catalyst to reduce the combustion temperature of particulates, have not been fully successful.

The use of trap heaters creates an intense load on batteries, especially because they are most needed at lower power settings where the electrical output is also low. The use of catalysts has taken many forms, but none have been found to be fully satisfactory. While catalysts can be very effective in reducing carbon monoxide and unburned hydrocarbons, they can be too easily fouled, have associated health risks, and/or catalyze the oxidation of $SO_2$ to $SO_3$ (which then combines with water and increases the weight of particulates), or have two more of these shortcomings.

In a recent assessment of this technology, R. Beckman et al assert that the technical challenge is to find a catalyst which selectively catalyzes the oxidation of carbonaceous components at low exhaust temperatures typical of diesels operating at partial load, and does not oxidize sulfur dioxide or nitrogen oxide at high load temperatures. ("A New Generation of Diesel Oxidation Catalysts", *Society of Automotive Engineers* (*SAE*) *Paper* No. 922330, 1992) They described tests studying the aging of platinum-catalyzed cordierite honeycomb traps, and concluded, inter alia, that the aging was related to adsorption of sulfur and that this depended on both the sulfur content of the fuel and the phosphorous content of the lubricating oil. With control of both of these, aging could be slowed. However, sulfur will remain in diesel fuels, even with planned reduction to 0.05%, and there will remain a need for a means to maintain the activity of catalysts for reducing emissions of carbon monoxide, unburned hydrocarbons, and reducing the ignition temperature of loaded traps.

In "Control of Diesel Engine Exhaust Emissions in Underground Mining", 2nd U.S. Mine Ventilation Symposium, Reno, Nev., Sep. 23–25, 1985, at page 637, S. Snider and J. J. Stekar report that precious metal catalysts in a catalytic trap oxidizer and a "catalyzed Corning trap" were effective in the capture of particulate matter, but both systems increased the conversion of $SO_2$ to $SO_3$. The increase in the rate of oxidation of the benign, gaseous dioxide form to the trioxide form results in the adsorption of greater amounts of acid sulfates and associated water onto the particulates discharged. Thus, the weight of the particulates is increased, and the difficulty in reaching regulatory compliance is increased.

The Snider et al report also discussed several other approaches, including the use of a fuel additive containing 80 ppm manganese and 20 ppm copper to reduce the regeneration temperature of the trap. While this was effective in reducing the particulate ignition temperature, these "base metal" catalysts were potentially problematic. Moreover, no measurable reductions in carbon monoxide, unburned hydrocarbons or $NO_x$ were noted.

In "Assessment of Diesel Particulate Control—Direct and Catalytic Oxidation", *Society of Automotive Engineers* (*SAE*) *Paper* No. 81 0112, 1981, Murphy, Hillenbrand, Trayser, and Wasser have reported that the addition of catalyst metal to trapped particulates can decrease particulate ignition temperatures. The catalysts were metal chlorides, including platinum chlorides. The use of halogens in platinum compounds, however, can lead to vaporization of the catalyst metal compound. Moreover, the above Snider et al article indicates that precious metal catalysts could be expected to increase the oxidation of $SO_2$ to $SO_3$.

In a 1987 report, R. W. McCabe and R. M. Sinkevitch summarized their studies of diesel traps catalyzed with platinum and lithium, both individually and in combination (Oxidation of Diesel Particulates by Catalyzed Wall-Flow Monolith Filters. 2. Regeneration Characteristics of Platinum, Lithium, and Platinum-Lithium Catalyzed Filters; *SAE Technical Paper Series*-872137). They noted that carbon monoxide conversion to the dioxide was negligible over the lithium filter, good for platinum, but good only initially for the combined catalyst. They further noted that platinum undergoes a reversible inhibition due to the presence of $SO_2$, but in the presence of the lithium catalyst there is apparently a wetting of the platinum crystallites by $Li_2O_2$. From this work, it can be seen that platinum and lithium on their own help burn out at low temperature, but not necessarily low enough to make supplemental heat unnecessary.

In a more recent report, B. Krutzsch and G. Wenninger discussed their investigation of sodium and lithium-based fuel additives (Effect of Sodium- and Lithium-Based Fuel Additives on the Regeneration Efficiency of Diesel Particulate Filters, *SAE Technical Paper Series* 922188, 1992). They noted that the predominantly used diesel additives were based on transition metals such as iron, copper, and manganese. They were interested in the sodium and lithium catalysts, however, because of the health concerns with the others. Moreover, the transition metals were seen to form oxides which foul the traps and cannot be easily removed. They found that the sodium and lithium additives did permit regeneration at temperatures low enough to possibly eliminate the need for supplementary heat, and did, therefore, have some promise in improving trap operation as was achieved previously with the transition metal catalysts. However, they also pointed out that there was no effect on the gaseous components, thus both carbon monoxide and unburned hydrocarbon levels remained higher than would be desired.

There is a present need for an improved means for rendering the exhaust from diesel engines more environmentally benign, and, especially to enable this without requiring engine retrofitting, the use of expensive catalytic units, or creating health concerns either from catalysts employed or the production of harmful by-products such as increased levels of sulfates in the discharged particulates.

DISCLOSURE OF INVENTION

The present invention relates to a method for improving the operation of a diesel engine with reduced emissions of particulates and $NO_x$. The method comprises: (a) adding to a diesel fuel, a fuel-soluble composition of platinum group metal in effective amounts such that the gases produced by combustion selectively catalyze the exhaust system, including a particulate trap, effectively to lower the emissions of unburned hydrocarbons and carbon monoxide; (b) combusting the diesel fuel in a diesel engine, resulting in the production of diesel combustion gases containing $NO_x$ and particulates; (c) contacting the combustion gases with a $NO_x$-reducing composition at a temperature effective to reduce the level of $NO_x$ in the combustion gases and produce ammonia by the decomposition of the $NO_x$-reducing composition; (d) passing the combustion gases through a particulate trap to reduce the level of particulates; and (e) passing the combustion gases through a catalyst to reduce $NO_x$ and ammonia produced by decomposition of the $NO_x$-reducing composition.

The $NO_x$-reducing composition is any NH-generating composition, preferably urea, it precursors and breakdown products effective under the conditions of contact with the exhaust to reduce the level of $NO_x$. The $NO_x$-reducing composition is preferably added to the diesel combustion gases as an aqueous solution, preferably with agitation, but can also be added to the cylinders of the diesel if done in dilute aqueous solution, especially in combination with a retardation in ignition timing.

By the term "selectively catalyzes", used above in connection with the description of the effect of the fuel-soluble composition on the diesel particulate trap, it is meant that a catalytic activity is achieved to reduce emissions of carbon monoxide and unburned hydrocarbons as compared to an uncatalyzed trap, and preferably causes less conversion of $SO_2$ to $SO_3$ than a trap catalyzed with platinum prior to operation. It is preferred to add another catalytic material selected from the group consisting of lithium, sodium, potassium, cerium, iron, copper and manganese to the fuel in amounts effective to reduce the regeneration temperature of the trap, but they can be added independently of the fuel e.g. with the urea or other $NO_x$-reducing agent. In its preferred aspects, the invention enables depositing sufficient catalyst in the exhaust system to reduce the regeneration temperature of the trap. In one alternative embodiment platinum and/or sodium, lithium or other catalyst compositions can be injected into the exhaust system to rapidly build up catalyst in the trap.

The platinum group metal compositions are preferably soluble in the diesel fuel and added in amounts effective to provide concentrations of the metal in the fuel of less than 1 part per million (ppm). The lithium and sodium compositions are preferably used in amounts to provide concentrations of lithium in the fuel of from about 1 to 100 ppm, when employed, and sodium at 1 to 30 ppm, when employed. For the purposes of this description, all "parts per million" figures are on a weight to volume basis, i.e., grams/million cubic centimeters (which can also be expressed as milligrams/liter), and percentages are given by weight, unless otherwise indicated.

DESCRIPTION OF THE DRAWINGS

The invention will be better understood and its advantages will be more apparent when the following detailed description is read in light of the accompanying drawings, wherein.

DETAILED DESCRIPTION OF THE PREFERRED EMBODIMENT

In this description, the term "diesel engine" is meant to include those reciprocating engines capable of being run on "diesel fuel", as defined by the American Society of Testing and Management (ASTM) Standard Specification for Fuel Oils (designation D 396-86). More generally, diesel fuel can be fuel oil No. 2 or No. 4 petroleum distillates as well as alternative diesel fuels containing emulsified water or alcohols such as ethanol or methanol, as long as they exhibit volatility and cetane number characteristics effective for the purpose.

Figure 1:
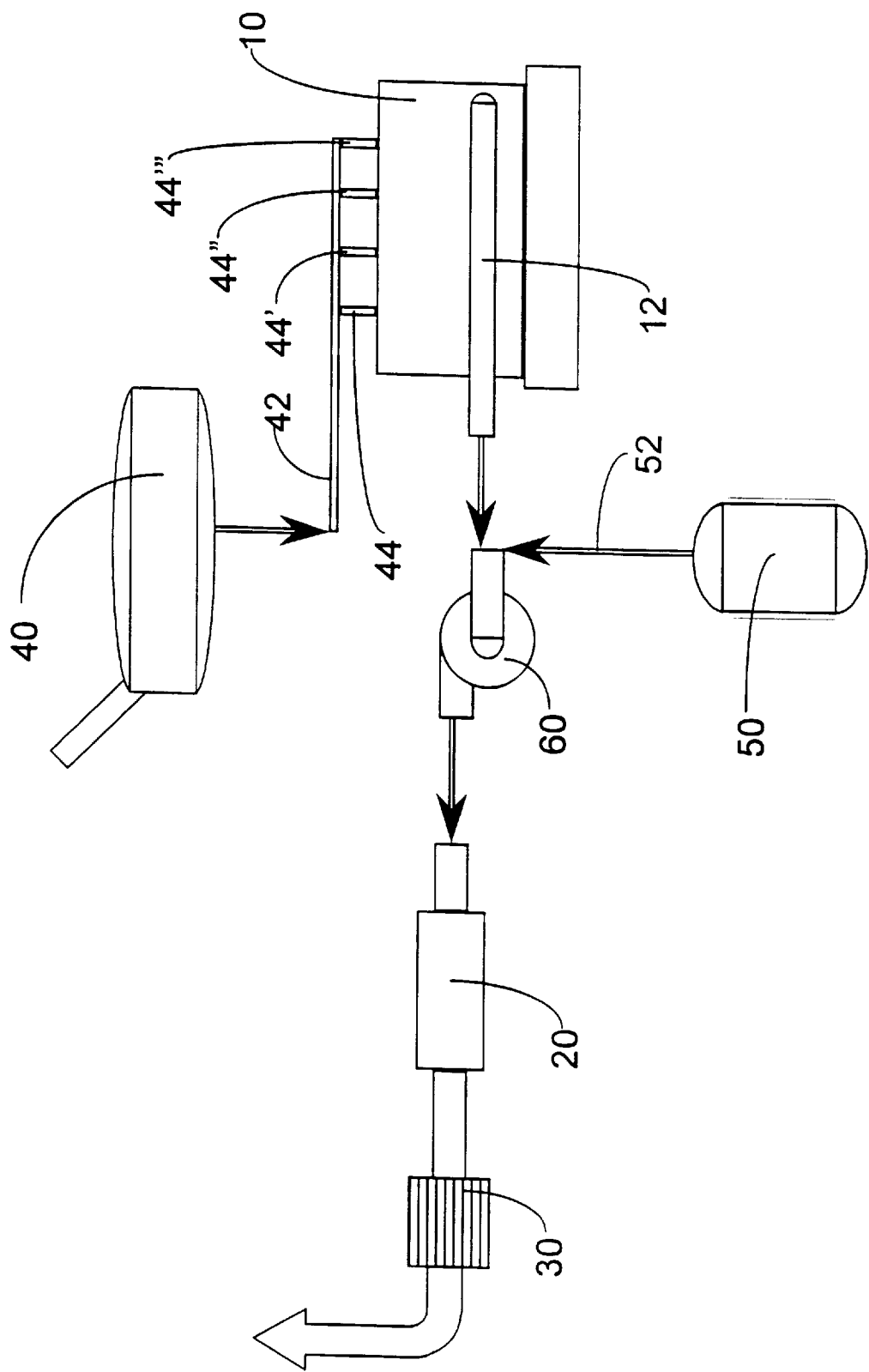
FIG. 1 is a schematic representation of one embodiment of the invention wherein $NO_x$-reducing composition is introduced into the exhaust system.
Figure 2:
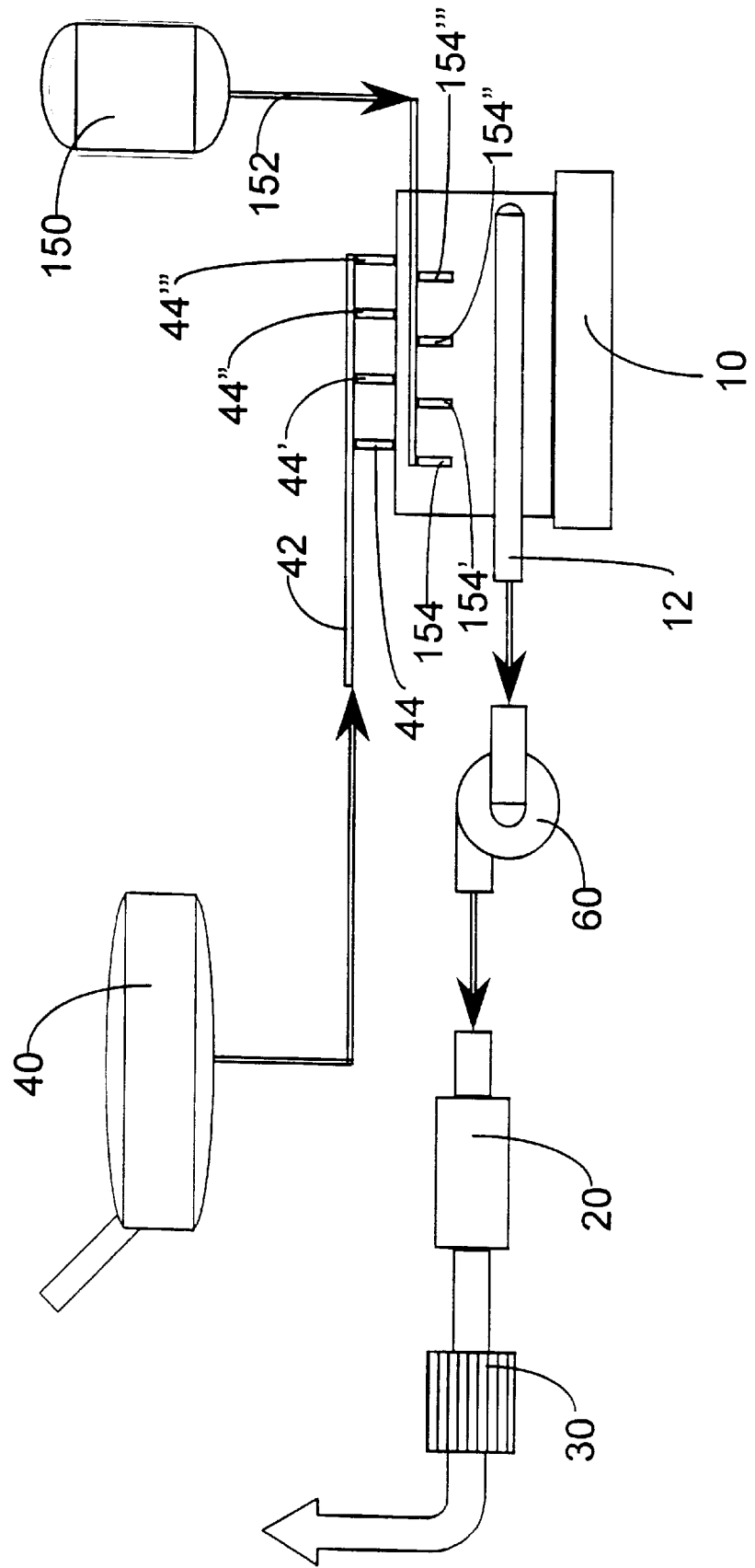
FIG. 2 is a schematic, similar to that of FIG. 1, but showing an embodiment wherein an aqueous solution of a $NO_x$-reducing agent such as urea is introduced directly into the cylinders of a diesel engine.

FIGS. 1 and 2 both show diesel engines 10 equipped with a diesel engine particulate trap 20. The trap 20 can be either catalyzed or uncatalyzed. If catalyzed, the trap catalyst can be in any stage of activity. Downstream of the diesel trap in each is a catalyst chamber 30. And, each engine is supplied with a fuel from a tank 40 and lines 42, 44, 44', 44", and 44'". FIG. 1 shows exhaust manifold 12 for carrying the hot combustion gases (exhaust) from the engine 10. The exhaust is treated by the introduction of a $NO_x$-reducing composition, such as urea or an effective urea hydrolysis product, supplied from a container 50 through line 52. A mixing device 60 enhances homogeneity and can be used to increase the temperature of the exhaust gas as required. FIG. 2 shows the $NO_x$-reducing composition introduced from tank 150 through lines 152, 154, 154', 154", and 154'" directly into the cylinders (not shown) of the engine 10.

Generally, the particulate trap in a diesel power plant will be at the end of the exhaust system for simplicity; however, in the present invention it is preferred to place it farther upstream. This has at least three advantages: (1) the exhaust in the trap is hotter and makes regeneration easier; (2) the exhaust entering the catalyst chamber 30 is cleaner; and (3) the temperature of the catalyst in chamber 30 is suitable for $NO_x$ reduction.

According to the method of the invention, a fuel-soluble composition of platinum group metal is added to the fuel, such as in tank 40. The platinum group metal is employed in an amount effective such that the exhaust produced by combustion selectively catalyzes the exhaust system, including a diesel trap, e.g. 30, effectively to lower the emissions of unburned hydrocarbons and carbon monoxide. Combustion of the diesel fuel in a diesel engine results in the production of diesel combustion gases containing $NO_x$ and particulates. The combustion gases are then contacted with a suitable $NO_x$-reducing agent, such as urea or an equivalent, at a temperature effective to reduce the level of $NO_x$ in the combustion gases and produce ammonia by the decomposition of the $NO_x$-reducing agent. The preferred temperatures for reaction between the $NO_x$-reducing composition and $NO_x$ in the combustion gases, falls within the range of from about 1600° to 2000° F. The exhaust is then passed through a particulate trap, such as 20, to reduce the level of particulates. Finally, the exhaust is passed into contact with a catalyst, such as in chamber 30, to reduce $NO_x$ and ammonia produced by decomposition of the urea.

The $NO_x$-reducing agent can be present as urea, its precursors or any effective hydrolysis product. Any composition which generates an effective gas-phase agent such as an amidozine radical (NH•), that is effective under the conditions of contact with the exhaust to reduce the level of $NO_x$, can be employed. Urea is an effective chemical for $NO_x$ reduction at high temperature and/or high pressure, but can be replaced with one or more of its hydrolysis products. Various NH-containing compositions, in their pure and typical commercial forms, will generate effective gas-phase agents (e.g., the amidozine radical) when introduced in aqueous solution and subjected to elevated temperatures. Among the prominent NH-containing compositions are those selected from the group consisting of ammonia, urea, urea precursors, urea hydrolysis products, products of reaction of urea with itself or other compositions, related compositions, and mixtures of these. Among these compounds are ammonium carbonate, ammonium formate, ammonium citrate, ammonium acetate, ammonium oxalate, other ammonium salts (inorganic and organic) particularly of organic acids, ammonium hydroxide, various stable amines, guanidine, guanidine carbonate, biguanide, guanylurea sulfate, melamine, dicyanimide, calcium cyanamide, cyanuric acid, biuret, 1,1-azobisformamide, methylol urea, methylol urea-urea, dimethyl urea, hexamethylenetetramine (HMTA), and mixtures of these.

Among the hydrolysis products are ammonia, carbamates such as ammonium carbamate, ammonium carbonate, ammonium bicarbonate and other ammonia salts, various urea complexes and half ammonia salts. The exact form of some of these compounds is not known because the techniques employed to analyze them can affect their makeup. U.S. Pat. No. 4,997,631 to Hofmann et al and PCT application WO 92/02291 to von Harpe et al, are incorporated herein by reference.

The urea (representative of $NO_x$-reducing compositions) is preferably added to the combustion gases as an aqueous solution. The solution can be prepared ahead of time and added premixed to the tank 50, 150 or the like, or the solution can be prepared as needed by mixing water with a water-soluble solid $NO_x$-reducing agent. In one embodiment, the tank 50 or 150 holds only water which is metered through cartridge holding solid $NO_x$-reducing agent.

Addition of the $NO_x$-reducing composition to the combustion gases is preferably enhanced with agitation. The solution can also be added to the cylinders of the diesel. When added to the combustion gases in the cylinders, the solution is preferably injected toward the end of the power stroke where the combustion gases are at a temperature of from about 1600° to about 2000° F. Injection into the cylinders is preferably done in dilute aqueous solution, and especially in combination with a retardation in ignition timing. When injected into the exhaust stream outside of the engine cylinders, the urea solutions are generally quite concentrated, typically from about 20 to about 50% by weight. When injected into the engine cylinders, the urea solutions are generally quite dilute, typically from about 5 to about 25%. These ranges overlap and for either use the concentration will be selected based on a balancing of effects of the added water.

Suitable diesel particulate traps are known to the skilled artisan and generally comprise an apparatus designed to trap or collect particulates which are present in the exhaust stream of the diesel engine. Such a trap can be made of any suitable material such as ceramic (for instance, a cordierite ceramic material), glass fiber, or metal. In addition, the trap can be coated with a catalytic material to facilitate regeneration. It is an advantage of the present invention, however, that the traps are selectively catalyzed during operation and are constantly maintained by the additive.

Since flow resistance to the exhaust increases in proportion to the efficiency of the diesel trap at collecting particulates, a compromise must be made between trap efficiency and exhaust back pressure. One type of diesel engine particulate trap which is found to be effective at trapping particulates while still providing an acceptable compromise in terms of back pressure created are traps available under the trademarks Dieselfilter or EX 51 100/17 from Corning Glass Corporation of Corning, N.Y.

Suitable diesel particulate traps typically consist of a gas permeable material, such as a ceramic. The trap is formed such that it has at least two (and generally several) parallel gas channels longitudinally arranged in a honey-comb-type structure extending between what can be referred to as an upstream, or engine-side, face and a downstream, or exhaust-side, face. Each channel is plugged at one of its faces such that alternate faces of adjacent channels are plugged. In this way, exhaust entering the trap through a channel at its unplugged upstream face must pass through a wall into an adjacent channel in order to exit the trap from its unplugged downstream face. Particulates in the exhaust are then trapped or collected on the wall. Such a trap is described, for instance, in U.S. Pat. No. 4,568,357 to Simon, the disclosure of which is incorporated herein by reference.

The particulate trap used in the method of the present invention can be one which is self-regenerating, that is, trapped particulates are ignited by heat derived from the engine, usually from the hot exhaust gases themselves. In order to reduce particulate buildup on the trap, it is desired that the particulates are combusted or "burned off" the trap in order to free the surface thereof for further collection of particulates. Under normal conditions, and without the use of a catalyst, temperatures of at least about 600° C. are believed to be required to combust the particulates and, thus, regenerate the trap. Since a four-stroke diesel engine produces an exhaust which operates at an average temperature between about 400° C. and 500° C., and which only occasionally reaches temperatures in excess of 600° C., the typical exhaust temperature is too low to lead to effective trap regeneration. A two-stroke diesel engine produces an exhaust which is at an even lower temperature, and which rarely exceeds 600° C., making trap regeneration even more reliant on auxiliary heat.

The fuel additives of the invention improve the operation of a diesel trap, either catalyzed or uncatalyzed, and if catalyzed in any stage of activity. The method comprises the addition of fuel-soluble compounds of a platinum group metal composition to a diesel fuel in effective amounts such that the exhaust produced by combustion selectively catalyzes the exhaust system, including the diesel trap, effectively to lower the emissions of unburned hydrocarbons and carbon monoxide. In its preferred aspects the invention enables depositing sufficient catalyst, which can also comprise sodium or lithium, in the exhaust system to reduce the regeneration temperature of the trap.

The platinum group metal compositions are preferably soluble in the diesel fuel and added in amounts effective to provide concentrations of the metal in the fuel of less than 1 part per million (ppm). The lithium and sodium compositions, when employed, are preferably used in amounts to provide concentrations of from about 1 to 100 ppm metal in the case of lithium, and at 1 to 30 ppm metal in the case of sodium.

Among the suitable lithium and sodium compositions are the salts of lithium and sodium respectively, with suitable organic compounds such as alcohols or acids, e.g., aliphatic, alicyclic and aromatic alcohols and acids. Exemplary of particular salts are the lithium and sodium salts of tertiary butyl alcohol and mixtures of these. Other lithium and sodium organic salts are available and suitable for use to the extent that they are fuel-soluble and are stable in solution. While not preferred, inorganic salts can also be employed to the extent that they can be efficiently dispersed in the fuel, such as in a stable emulsion or otherwise, and have the desired effect in the exhaust system including the trap. These compositions should be free of the contaminants mentioned below which will affect the performance of the platinum group metal.

In other embodiments the useful salts of manganese, iron, copper, cerium and potassium can be employed at suitable levels, e.g., from about 5 to 100 ppm and preferably 30 to 60 ppm of the catalyst metal in combination with the platinum group metal composition in diesel fuels or as part of the separate injection of urea upstream of the particulate trap. The above references and those cited therein are incorporated by reference to show specific salts of these metals. In these embodiments the addition of platinum group metal catalysts according to the invention reduces the level of unburned hydrocarbons and carbon monoxides while obtaining the known effects of these other catalyst metals.

Preferred additives comprise a diesel-fuel-soluble organometallic platinum group metal coordination composition and a diesel fuel soluble composition of sodium and/or lithium. The additive compositions should be temperature stable, and substantially free of phosphorus, arsenic, antimony, or halides. Advantageously, the additive also has a partition ratio sufficient to maintain significant preferential solubility in the fuel in order to effectively enhance combustion.

The organic nature of the compositions provides solubility in diesel fuel, thereby facilitating the introduction of the additive into the combustion chamber of a diesel engine. Without such solubility, much of the additive would precipitate in the fuel tank or fuel lines of the diesel engine prior to introduction into its combustion chamber.

Temperature stability of the additive is very important in practical and operational terms. In a commercial setting, a fuel additive is packaged and then can often sit on a store shelf or in a delivery truck for extended periods of time during which the additive can be exposed to great variations in temperature. If the breakdown temperature of the additive is not sufficiently high (i.e., if the additive is not temperature stable at the temperatures to which it is expected to be exposed), then the packaged additive will quickly break down and become virtually useless.

Moreover, breakdown of the additive after mixing with the fuel will render the additive insoluble in the fuel, since the solubility is provided by the organic functional groups. Such loss of solubility will cause the additive to precipitate and not reach the combustion chamber, as discussed above. This becomes important when the additive is mixed into the fuel in advance of the fuel being provided to the fuel system of the engine (as opposed to a separate additive reservoir on the vehicle, with mixing occurring immediately prior to combustion), as desired.

Typically, the breakdown temperature of the additive should be at least about 40° C., preferably at least about 50° C., in order to protect against most temperatures to which it can be expected to be exposed. In some circumstances, it will be necessary that the breakdown temperature be no lower than about 75° C.

The organic nature of the preferred platinum group metal compositions helps to maintain the composition in solution in an organic solvent which provides a convenient diluent and can have functional properties, thereby preventing "plating out" of the platinum group metal composition in the packaging medium.

The additive of the present invention should be substantially free from objectionable traces of, or functional groups containing, phosphorus, arsenic, antimony, and, especially, halogens (i.e., they should not contain a substantial amount of such functional groups) which have significant disadvantages like "poisoning" or otherwise reducing the effectiveness of the platinum group metal composition catalyst or the sodium or lithium compositions if employed. Halogens have the additional undesirable effect of rendering a platinum group metal more volatile, leading to reduction of the amount of platinum group metal in the combustion chamber and engine system.

A substantial amount of such functional groups is considered an amount effective to significantly reduce the effectiveness of the catalyst. Preferably, the purified platinum group metal additive composition contains no more than about 500 ppm (on a weight per weight basis) of phosphorus, arsenic, antimony, or halogens, more preferably no more than about 250 ppm. Most preferably, the additive contains no phosphorus, arsenic, antimony, or halogens.

Such objectionable functional groups can be minimized in several ways. The platinum group metal composition can be prepared in a process which utilizes precursors or reactant compositions having a minimum of such functional groups; or the additive can be purified after preparation. Many such methods of purification are known to the skilled artisan.

One preferred method of purifying the platinum group metal additive to remove halogens is a process utilizing silver salts having non-halide anions which are harmless as compared to the halogens being replaced and involves reacting them with the platinum group metal compound, whereby the halogens in the composition are replaced by the anion of the silver salt (which can be any silver salts of carboxylic acids, such as silver benzoate, or silver nitrate) and the resulting composition is free of halogens, plus a silver halide is produced.

For instance, a slurry or solution in a polar solvent such as acetone or an alcohol and water of silver nitrate or silver benzoate can be prepared and reacted with the platinum group metal composition. The resultant platinum group metal composition is a benzoate or nitrate salt with silver halide also being produced. This process can be expected to reduce the halogen content of a sample by about 50%, and even up to about 90% and higher.

The relative solubility of the additive in the diesel fuel and water is also important since there is often a substantial amount of water admixed with the fuel. This relative solubility is referred to as the partition ratio and can be expressed as the ratio of the amount in milligrams per liter of composition which is present in the fuel to the amount which is present in the water. This can most easily be determined in a 100 milliliter (ml) sample which is 90% fuel and 10% water. By determining the amount of composition in the fuel and the amount in the water, the partition ratio can be readily determined.

The preferential solubility of the additive in fuel as compared to water can be critical because if a substantial amount of the additive is dissolved in the water which may be present, the overall effectiveness of the additive can be proportionally reduced. This partition ratio should be at least about 25 and is most preferably greater than about 50.

In order to reduce the water susceptibility of the platinum group metal composition, it is especially desired that the composition have at least one platinum group metal-to-carbon covalent bond. A platinum group metal-to-oxygen or platinum group metal-to-nitrogen bond can be acceptable, but there must also be at least one metal to carbon bond.

Platinum group metals include platinum, palladium, rhodium, ruthenium, osmium, and iridium. Compounds including platinum, palladium, and rhodium, especially compounds of platinum alone or possibly in combination with rhodium compounds are preferred in the practice of this invention since the vapor pressure of these metals is sufficiently high to facilitate the desired reduction of carbon monoxide emissions.

The preferred class of fuel soluble catalyst compositions include compounds where the platinum group metal exists in oxidation states II and IV. Compounds in the lower (II) state of oxidation are preferred due to their function in generating the catalytic effect. A significant feature of the invention is the use of platinum group metal II coordination compounds having at least one coordination site occupied by a functional group containing an unsaturated carbon-to-carbon bond. Preferably, two or more of the coordination sites will be occupied by such functional groups since the stability and solubility in diesel fuel of compounds having such multiple functional groups are improved. While not wishing to be bound to any particular theory, it is believed that such preferred compounds in the lowest possible oxidation state are the most beneficial for producing the desired catalytic effect.

Occupation of one of more coordination sites with the following unsaturated functional groups has been found useful:

(1) Benzene and analogous aromatic compounds such as anthracene and naphthalene;

(2) cyclic dienes and homologues such as cyclooctadiene, methyl cyclopentadiene, and cyclohexadiene;

(3) Olefins such as nonene, dodecene, and polyisobutenes; and (4) Acetylenes such as nonyne and dodecyne.

These unsaturated functional groups, in turn, can be substituted with nonhalogen-substituents such as alkyl, carboxyl, amino, nitro, hydroxyl, and alkoxyl groups. Other coordination sites can be directly occupied by such groups.

The general formula for the preferred coordination II compounds is:

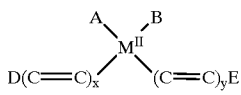

where $M^{II}$ represent the platinum group metal, with a valence of +2, where A, B, D, and E are groups such as alkoxy, carboxyl, etc. described above, where $(C=C)_x$ and $(C=C)_y$ represent unsaturated functional groups coordinated with the platinum group metal, and where x and y are any integer, typically 1 to 5.

The most preferred platinum group coordination compounds are those represented by the following formula:

XM''R₂ wherein X is a cyclooctadienyl ligand, M is a platinum group metal, and R is benzyl, phenyl, or nitrobenzyl.

Among other platinum group metal compounds, are the following which include at least one sigma or pi carbon to platinum group metal bond, including (a) 2,2'-bis(N,N-dialkylamino)1,1'-diphenyl metals, such as represented by the formula

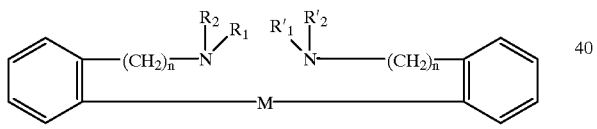

wherein M is a platinum group metal; $R_1$ and $R_2$ are lower alkyl, e.g., from 1 to 10 carbons; and each n is, independently, an integer from 1 to 5. Representative of this group is 2,2'-bis(N,N-dimethylamino)1,1'-diphenyl palladium;

(b) tetrakis (alkoxy carbonyl) metal cycloalkenes, as represented by the formula

M(C₄COOR₁)₄R₂ wherein M is a platinum group metal; $R_1$ is a lower alkyl, e.g., from 1 to 5 carbons, and $R_2$ is a cycloalkene having, e.g., from 5 to 8 carbons and from 2 to 4 unsaturations within the ring structure. Representative of this group is tetrakis (methoxy carbonyl) palladia cyclopentadiene;

(c) μ-diphenyl acetylene bis ($\eta^5$pentaphenyl cyclopentadiene) di metals as represented by the formula

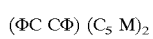
(ΦC CΦ) (C₅ M)₂ wherein M is a platinum group metal and Φ is phenyl. Representative of this group is μ-diphenyl acetylene bis ($\eta^5$-pentaphenyl cyclopentadiene) dipalladium;

(d) dialkyl dipyridyl metals of the formula

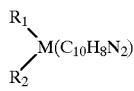

wherein M is a platinum group metal; and $R_1$ and $R_2$ are lower alkyl, e.g., having from 1 to 5 carbons. Representative of this group is diethyl dipyridyl palladium; and (e) bis (π-allyl) metals of the formula

(R—C₃H₅)₂M wherein M is a platinum group metal and R is hydrogen, aryl, or alkyl, e.g., one to ten carbons. Representative of this group is bis (phenyl allyl) palladium.

Other specific suitable compounds according to the present invention include those platinum group metal-containing compositions selected from the group consisting of f) a composition of the general formula

LMR¹R² wherein $L^1$ is either a single cyclic polyolef in or nitrogenous bidentate ligand or a pair of nitrogenous or acetylenic monodentate ligands, preferably cyclooctadienyl; M is a platinum group metal, especially platinum itself; and $R^1$ and $R^2$ are each, independently, substituted or unsubstituted lower alkyl (e.g., 1–5 carbons) benzyl, nitrobenzyl, aryl, cyclopentadiene or pentamethyl cyclopentadiene, preferably benzyl, methyl and/or phenyl;

g) a composition of the general formula

LMR wherein L is either a single cyclic polyolefin or nitrogenous bidentate ligand or a pair of nitrogenous or acetylenic monodentate ligands; M is a platinum group metal, especially rhodium or iridium; and R is cyclopentadiene or pentamethyl cyclopentadiene;

h) a composition of the general formula

LM(C₄R₄)

wherein L is either a single cyclic polyolefin or nitrogenous bidentate ligand or a pair of nitrogenous monodentate ligands; M is platinum, palladium, rhodium, or iridium; and R is COOR, wherein R is hydrogen or alkyl having from 1 to 10 carbons, preferably methyl;

i) a composition of the general formula

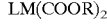
LM(COOR)₂ or a dimer thereof, wherein L is a non-nitrogenous cyclic polyolefin ligand, preferably cyclooctadiene or pentamethyl cyclopentadiene; M is platinum or iridium; and R is benzyl, aryl, or alkyl, preferably having 4 or more carbons, most preferably phenyl;

j) a composition comprising a reaction product of [LRhX]₂ and RMgX wherein L is a non-nitrogenous cyclic polyolefin ligand, preferably cyclooctadiene or pentamethyl cyclopentadiene; R is methyl, benzyl, aryl, cyclopentadiene or pentamethyl cyclopentadiene, preferably benzyl or phenyl, and X is a halide. Although presently uncharacterized, it is believed that this reaction product assumes the formula LRhR.

Functional groups which are especially preferred for use as ligands L in compositions f–j are neutral bidentate ligands such as cyclopentadiene, cyclooctadiene, pentamethyl cyclopentadiene, cyclooctatetrene, norbornadiene, o-toluidine, o-phenantholine, and bipyridine. Most preferred among monodentate ligands is pyridine.

Also useful in the present invention are k) palladium acetylene complexes having the general formula

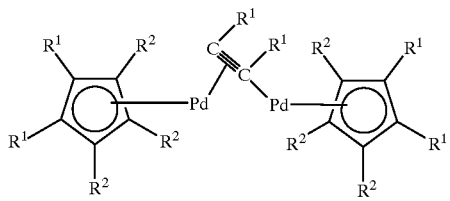

wherein $R^1$ is aryl or alkyl; and $R^2$ is aryl;

l) metal allyl complexes having the general formula $M(C_3H_5)_3$ or $M(C_3H_5-R)_2$ wherein M is platinum group metal, especially rhodium or iridium; and R is hydrogen, aryl, or alkyl;

m) platinum (IV) compositions having the general formula $R_3PtR$ wherein R is aryl, alkyl or mixtures thereof; and R is hydroxyl (—OH), acetylacetonate (—$CH_3(COCH_3)_2$), cyclopentadiene or pentamethyl cyclopentadiene (exemplary of which is trimethyl platinum hydroxide); and n) a composition of the general formula

LMR wherein L is substituted or unsubstituted butadiene or cyclohexadiene; M is rhodium or iridium; and R is cyclopentadiene or pentamethyl cyclopentadiene (exemplary of which are butadiene rhodium cyclopentadiene and butadiene iridium cyclopentadiene.

The synthesis of the preferred compounds is relatively straightforward, with the most care being taken to avoid "contamination" of the product by the objectionable functional groups discussed above. For instance, the most preferred synthetic route for production of the compounds of the formula $LMR^1R^2$ is by reacting commercially available platinum halides with the desired neutral ligand (except the pyridine derivative which can be added by displacement after the fact) and then reacting with a Grignard reagent having the formula $R_2MgX$, where X is a halide (and where the desired $R^1$ and $R^2$ in the end product are the same functional group). Where the $R^1$ and $R^2$ functional groups are desired to be different, a straightforward substitution reaction can then be run.

Exemplary of compounds suitable for use in the present invention and prepared in this manner are dipyridine platinum dibenzyl; bipyridine platinum dibenzyl; dipyridine palladium diethyl; cyclooctadiene platinum dimethyl; cyclooctadiene platinum diphenyl; cyclooctadiene platinum dibenzyl; cyclooctadiene platinum dinitrobenzyl; cyclooctadiene platinum methyl cyclopentadiene; norbornadiene platinum di-cyclopentadiene; dimethyl platinum cyclooctatetrene (which often assumes the formula dimethyl platinum cyclooctatetrene platinum dimethyl); and cyclooctadiene osmium bis (cyclopentadiene).

The compounds of the formula LMR are prepared along a similar pathway, as are the reaction products of $[LRhX]_2$ and RMgX, with the exception that the starting materials have only one R functional group and are, with respect to LMR, LRhR or LIrR. Exemplary of suitable compounds of the formula LMR are cyclooctadiene rhodium cyclopentadiene; cyclooctadiene rhodium pentamethyl cyclopentadiene; norbornadiene rhodium pentamethyl cyclopentadiene; cyclooctadiene iridium cyclopentadiene; cyclooctadiene iridium pentamethyl cyclopentadiene; norbornadiene iridium cyclopentadiene; and norbornadiene iridium pentamethyl cyclopentadiene. Exemplary of compounds which can function as the precursors for the reaction product can include cyclooctadiene rhodium chloride dimer and benzyl magnesium chloride.

Advantageously, in the Grignard-type syntheses, the Grignard reagent can be replaced by one having the formula $R_2Z$ where Z is commonly Na, Li, K, or Tl. This is especially preferred since the halides which are present in a Grignard reagent are eliminated, providing less halides in the final product and also advantageously producing a higher yield of the desired product.

The preparation of compositions of the formula $LM(C_4R_4)$ is also straightforward and proceeds by reacting M(dibenyilidine acetone)$_2$ with dimethylacetylene dicarboxylate in acetone and then adding the L ligand. Exemplary of suitable compounds according this formula, which has the structure

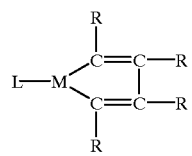

is tetrakis (methoxy carbonyl) palladia cyclopentadiene (wherein L is cyclopentadiene, M is palladium, and R is $COOH_3$)

The compositions of the formula $LM(COOR)_2$ can be prepared by reacting $LMX_2$, where X is a halide and a silver carboxylate such as silver benzoate. This composition can form a dimer, especially when M is platinum. Exemplary of suitable compounds having the general formula $LM(COOR)_2$ are cyclooctadiene platinum dibenzoate dimer; and pentamethyl cyclopentadiene iridium dibenzoate.

The most preferred synthetic route for production of the noted acetylene compounds is by reacting the trimeric palladium salt of a carboxylic acid ($[Pd(OOCR)_2]_3$), where R is alkyl such as methyl or ethyl, or aryl such as phenyl, like palladium acetate, propionate or benzoate, with a substituted acetylene, such as diphenylacetylene or methylphenylacetylene, in the presence of a polar solvent, such as an alcohol like methanol ($CH_3OH$). For example, when the reactants are palladium acetate and diphenylacetylene, the product is μ-diphenylacetylene bis (η5 pentaphenyl cyclopentadiene) dipalladium, which has the general formula

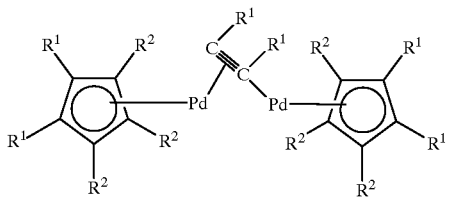

where $R^1$ and $R^2$ are each phenyl.

The disclosed metal allyl compositions can be prepared by reacting commercially available platinum group metal halides, such as $RhCl_3$ or $IrCl_3$, with an allyl Grignard reagent, such as $C_3H_5MgBr$, in a 3:1 molar ratio to produce the desired metal allyl, such as bis (phenyl allyl) palladium, and MgBrcl.

The platinum (IV) compositions can be prepared, for instance, by reacting $R^1{}_3PtX$, where $R^1$ is aryl or alkyl, such as phenyl, benzyl or methyl or mixtures and X is a halide, with $NaR^2$, where $R^2$ is cyclopentadiene or pentamethyl cyclopentadiene.

Reaction of the $R_3PtX$ complex with aqueous acetone solutions containing a silver compound such as $Ag_2O$ results in a product where R is hydroxyl. Alternatively, treatment of the $R_3PtX$ complex with a solution of acetylacetone in alcoholic potassium hydroxide results in a product where R is acetyl acetonate.

The compounds of the formula LMR can be prepared by reacting commercially available metal halides with butadiene and cyclohexadienes and then reacting with a Grignard reagent having the formula RMgX, where X is a halide.

Typically, in order to provide sufficient additive, the platinum group metal compound will supply an amount of the platinum group metal within a range of about 0.01 to 1.0 parts of the platinum group metal per one million parts of fuel (ppm w/v) in order to "build up" sufficient platinum group metal over time, for instance, between about 50 and 1000 hours of operation. Lower times will be required where no effect on particulate trap regeneration temperature is required. Lithium or sodium compounds will aid in reducing the regeneration temperature after shorter break-in periods. A more preferred range is from about 0.05 to 0.5 ppm and, most preferably, the platinum group metal will be supplied at a level of from about 0.10 to 0.30 ppm on the same basis.

The additive composition may include a solvent which is soluble in the fuel, such as octyl nitrate. The fuel additive compositions may also contain other additives, such as detergents, antioxidants, and cetane improvers which are known as beneficial to engine performance, but the use of such is not an essential feature of the invention.

The total amount of solvent and other additives used will depend on the dosage of platinum group metal composition required and on what is a convenient concentration to handle relative to the amount of fuel to be treated. Typically, solvent (plus other like additive) volumes of about 0.1 to about 40.0 liters/gram of platinum group metal composition are acceptable.

Alternatively, the additive can be provided at a ratio so as to provide a sufficient level of platinum group metal catalyst in a relatively short period of time, i.e., under about 10 hours, more preferably under about 5 hours. Effective levels to do so can range up to about 30 ppm, more advantageously, about 15 to about 25 ppm. These levels should be provided for about 0.5 to about 10 hours. Maintenance amounts of from about 0.1 to about 1.0 ppm can then be provided, to maintain superior activity.

In another alternative embodiment, an additive can be injected into the exhaust system, preferably just prior to the particulate trap, to supply catalyst on an initial or renewal basis. In this embodiment, the additive can contain platinum group metal and/or lithium, sodium or a combination of these. The concentration of catalyst for this use will be a level sufficient under the conditions e.g. from about 1 to about 100 ppm for the platinum group metal and from about 1 to 200 ppm for the lithium or sodium. The solvent or carrier should be rapidly volatilized and any organic component of the solvent or the catalyst compounds should be capable of burning off at the steady state exhaust temperature, e.g. in the range of 300° to 600° F.

It has surprisingly been found that the use of the platinum group metal additives of this invention reduces the conversion of $SO_2$ to $SO_3$ as compared to conventional platinum-catalyzed particulate traps which have the platinum metal applied. This selectivity, however, does not diminish the ability of the catalyst to reduce the emissions of carbon monoxide and unburned hydrocarbons on a steady basis.

In one particularly preferred embodiment, the combination of a particulate trap and a fuel additive comprising at least a platinum group metal composition in catalytic amounts (preferably also lithium and/or sodium compositions) is employed along with a technique to control $NO_x$ emissions, such as flue gas recirculation or retarding engine timing. In this manner, the combined emissions of HC, CO, $NO_x$ and particulates are reduced from what is possible with current technology.

It is an advantage of the invention that the use of the noted additives, when effective catalyst levels are built up, can reduce the ignition temperature of the particulates trapped in the particulate trap to a level whereby self-regeneration of the particulate trap, especially in a four-cycle diesel engine may occur. Even if self-regeneration cannot completely occur, i.e., in a four-cycle engine which is not operating hot enough or in a two-cycle engine, the use of the described additives can reduce the temperature to which an auxiliary heat source is required to raise the diesel engine particulate trap, thereby increasing the efficiency of the use of the auxiliary heat source. In this way, further significant improvements in the use of a diesel engine particulate trap are obtained, without the art accepted tradeoff of substantially increased back pressure caused by clogging of the trap by collected particulates.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

I claim:

1. A method for operating a diesel engine with reduced emissions of particulates and $NO_x$, comprising:

(a) adding to a diesel fuel, a fuel-soluble composition of platinum group metal in effective amounts such that the gases produced by combustion selectively catalyze the exhaust system, including a particulate trap, effectively to lower the emissions of unburned hydrocarbons and carbon monoxide, said platinum group metal composition comprising a fuel soluble organic compound which
- I) is resistant to breakdown under ambient temperatures;
- ii) is substantially free of phosphorus, arsenic, antimony, or halogens;
- iii) has a partition ratio sufficient to maintain preferential solubility in the fuel;
- iv) has a breakdown temperature of at least about 122° F. and
- v) a partition ratio of at least about 25;

(b) combusting the diesel fuel in a diesel engine resulting in the production of diesel combustion gases containing $NO_x$ and particulates;

(c) injecting into the combustion gases within the cylinder of the diesel engine near the end of the power stroke where the temperature is within the range of from 1600° and 2000° F. an aqueous solution of a $NO_x$-reducing composition which produces ammonia by the decomposition of the $NO_x$-reducing composition selected from the group consisting of urea, cyanuric acid, dicyanimide, calcium cyanamide, and mixtures of these, the temperature being effective to reduce the level of $NO_x$ in the combustion gases and produce ammonia by the decomposition of the $NO_x$-reducing composition;

(d) passing the combustion gases containing ammonia through a particulate trap comprised of a gas permeable material to reduce the level of particulates; and (e) passing the combustion gases through a $NO_x$-reduction catalyst to reduce $NO_x$ and ammonia produced by decomposition of the $NO_x$-reducing composition.

2. A method according to claim 1 wherein the fuel further includes at least one catalytic material selected from the group consisting of sodium, lithium, potassium, cerium, iron, copper, and manganese, in an amount of from 5 to 100 pm effective to catalyze the exhaust system by combusting the fuel.

3. A method according to claim 1 wherein the fuel further includes lithium and/or sodium composition in an amount to provide a concentration of from about 1 to 100 ppm metal in the case of lithium, and at 1 to 30 ppm metal in the case of sodium.

4. A method according to claim 1 wherein the fuel additive is employed at a level which is effective to reduce the oxidation of $SO_2$ to $SO_3$ while maintaining a high level of conversion of carbon monoxide and hydrocarbons.

5. A method according to claim 1 wherein the platinum group metal composition is added in an amount effective to provide a concentration of the metal in the fuel of less than 1 part per million (ppm).

6. A method of claim 1, wherein said diesel engine is modified by retarding engine timing or recirculating exhaust gas effectively to reduce $NO_x$ emissions.

7. A method according to claim 1 wherein the engine is operated for a sufficient period of time to deposit sufficient catalyst in the exhaust system to reduce the regeneration temperature of the trap.

8. A method of claim 1, wherein a catalytic metal composition comprising a metal selected from the group consisting of platinum group metals, iron, copper, cerium, manganese, and mixtures of any of these, is introduced with the aqueous solution of $NO_x$-reducing composition.

9. A method according to claim 1 which further includes retarding ignition timing sufficiently to cause a reduction in $NO_x$.

10. A method according to claim 1 wherein the $NO_x$-reducing composition is maintained in a cartridge in solid form and is mixed with water in metered amounts to form an aqueous solution of $NO_x$-reducing composition for admixing with the combustion gases.

11. A method for operating a diesel engine with reduced emissions of particulates and $NO_x$, comprising:

(a) adding to a diesel fuel, a fuel-soluble composition of platinum group metal and at least one catalytic material selected from the group consisting of sodium, lithium, potassium, cerium, iron, copper, and manganese in effective amounts such that the gases produced by combustion selectively catalyze the exhaust system, including a particulate trap, effectively to lower the emissions of unburned hydrocarbons and carbon monoxide;

(b) combusting the diesel fuel in a diesel engine resulting in the production of diesel combustion gases containing $NO_x$ and particulates;

(c) admixing the combustion gases with an aqueous solution of $NO_x$-reducing composition at a temperature effective to reduce the level of $NO_x$ in the combustion gases and produce ammonia by the decomposition of the $NO_x$-reducing composition selected from the group consisting of urea, ammonium carbamate, ammonium bicarbonate, ammonium carbonate and mixtures;

(d) passing the composition gases through a particulate trap to reduce the level of particulates; and (e) passing the combustion gases through a $NO_x$-reducing catalyst to reduce $NO_x$ and ammonia produced by decomposition of the $NO_x$-reducing composition.

12. A method according to claim 11 wherein the $NO_x$-reducing composition is added to the combustion gases in the cylinder of the diesel engine near the end of the power stroke where the temperature of the combustion gases is within the range of from about 1600° to 2000° F.

13. A method according to claim 11 wherein the $NO_x$-reducing composition is added to the combustion gases in the exhaust system prior to the particulate trap where the temperature of the combustion gases is within the range of from about 1600° to 2000° F.

14. A method for operating a diesel engine with reduced emissions of particulates and $NO_x$, comprising:

(a) adding to a diesel fuel, a fuel-soluble composition of platinum group metal in effective amounts such that the gases produced by combustion selectively catalyze the exhaust system, including a particulate trap, effectively to lower the emissions of unburned hydrocarbons and carbon monoxide, said platinum group metal composition comprising a fuel soluble organic compound which
- I) is resistant to breakdown under ambient temperatures;
- ii) is substantially free of phosphorus, arsenic, antimony, or halogens;
- iii) has a partition ratio sufficient to maintain preferential solubility in the fuel;
- iv) has a breakdown temperature of at least about 122° F.; and
- v) a partition ratio of at least about 25;

(b) combusting the diesel fuel in a diesel engine resulting in the production of diesel combustion gases containing $NO_x$ and particulates;

(c) passing the gases to an exhaust system at a temperature of from about 752° to about 2000° F.;

(d) injecting into the combustion gases an aqueous solution of a $NO_x$-reducing composition which produces ammonia by the decomposition of the $NO_x$-reducing composition selected from the group consisting of urea, cyanuric acid, calcium cyanamide and mixtures of these, whereby ammonia is produced by the decomposition of the $NO_x$-reducing composition;

(e) passing the combustion gases containing ammonia through a particulate trap comprised of a gas permeable material to reduce the level of particulates; and (f) passing the combustion gases through a $NO_x$-reduction catalyst to reduce $NO_x$ and ammonia produced by decomposition of the $NO_x$-reducing composition.

15. A method according to claim 14 wherein the fuel further includes at least one catalytic material selected from the group consisting of sodium, lithium, potassium, cerium, iron, copper, and manganese, in an amount of from 5 to 100 ppm effective to catalyze the exhaust system by combusting the fuel.

16. A method according to claim 14 wherein the engine is operated for a sufficient period of time to deposit sufficient catalyst in the exhaust system to reduce the regeneration temperature of the trap.

17. A method of claim 14, wherein a catalytic metal composition comprising a metal selected from the group consisting of platinum group metals, iron, copper, cerium, manganese, and mixtures of any of these, is introduced with the aqueous solution of $NO_x$-reducing composition.

18. A method according to claim 14 wherein the $NO_x$-reducing composition is maintained in a cartridge in solid form and is mixed with water in metered amounts to form an aqueous solution of $NO_x$-reducing composition for admixing with the combustion gases.

* * * * *